United States Patent
Good et al.

(10) Patent No.: US 9,580,166 B2
(45) Date of Patent: Feb. 28, 2017

(54) SYSTEM FOR LATCHING AND LOCKING A FOLDING WING

(71) Applicant: The Boeing Company, Chicago, IL (US)

(72) Inventors: Mark S. Good, Seattle, WA (US); Steven Paul Walker, Arlington, WA (US); Matthew A. Lassen, Seattle, WA (US); Quentin T. Pietersen, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 147 days.

(21) Appl. No.: 14/165,561

(22) Filed: Jan. 27, 2014

(65) Prior Publication Data

US 2015/0210377 A1    Jul. 30, 2015

(51) Int. Cl.
*B64C 3/56* (2006.01)

(52) U.S. Cl.
CPC .............. *B64C 3/56* (2013.01); *Y02T 50/145* (2013.01); *Y10T 403/32254* (2015.01)

(58) Field of Classification Search
CPC .... B64C 3/56; B64C 3/26; B64C 3/38; B64C 2201/102; B64C 37/00; B64C 1/26; B64C 1/063; B64C 5/10; Y02T 50/145; Y10T 403/32254
USPC ................ 244/1 R, 129.1, 131, 49, 124, 218
See application file for complete search history.

(56) References Cited

U.S. PATENT DOCUMENTS

| | | | | |
|---|---|---|---|---|
| 5,201,479 A | * | 4/1993 | Renzelmann | B64C 3/56 244/49 |
| 5,310,138 A | | 5/1994 | Fitzgibbon | |
| 5,350,135 A | * | 9/1994 | Renzelmann | B64C 3/56 244/49 |
| 5,381,986 A | | 1/1995 | Smith et al. | |
| 5,427,329 A | * | 6/1995 | Renzelmann | B64C 3/56 244/49 |
| 5,452,643 A | * | 9/1995 | Smith | B64C 3/56 475/332 |
| 5,558,299 A | | 9/1996 | Veile | |
| 6,260,799 B1 | | 7/2001 | Russ | |
| 8,210,473 B2 | * | 7/2012 | Schweighart | B60F 5/02 244/49 |
| 9,211,946 B2 | * | 12/2015 | Good | B64C 3/56 |
| 2010/0019080 A1 | | 1/2010 | Schweighart | |
| 2013/0099060 A1 | * | 4/2013 | Dees | B64C 3/56 244/199.4 |
| 2013/0327883 A1 | * | 12/2013 | Kordel | B64C 3/56 244/49 |
| 2014/0061371 A1 | * | 3/2014 | Good | B64C 3/56 244/49 |

(Continued)

FOREIGN PATENT DOCUMENTS

| | | | | |
|---|---|---|---|---|
| EP | 2650212 A1 | 10/2013 | | |
| EP | 2955103 A1 | * 12/2015 | | B64C 13/38 |
| GB | 533900 A | * 2/1941 | | B64C 3/56 |

*Primary Examiner* — Benjamin P Lee
(74) *Attorney, Agent, or Firm* — Miller, Matthias & Hull LLP

(57) ABSTRACT

A folding wing comprises a fixed section, a folding section, and a latch system for latching the folding section to the fixed section. The latch system includes a plurality of latch pins, and a corresponding plurality of non-backdriveable mechanical actuators for extending the latch pins to engage the folding section.

14 Claims, 9 Drawing Sheets

(56) References Cited

U.S. PATENT DOCUMENTS

| | | | | |
|---|---|---|---|---|
| 2014/0117150 A1* | 5/2014 | Good | ................. | B64C 3/56 |
| | | | | 244/49 |
| 2014/0319268 A1* | 10/2014 | Lassen | ................. | B64C 3/56 |
| | | | | 244/49 |
| 2015/0014478 A1* | 1/2015 | Lassen | ................. | B64C 3/56 |
| | | | | 244/49 |
| 2015/0360770 A1* | 12/2015 | Good | ................. | B64C 13/38 |
| | | | | 244/199.3 |

* cited by examiner

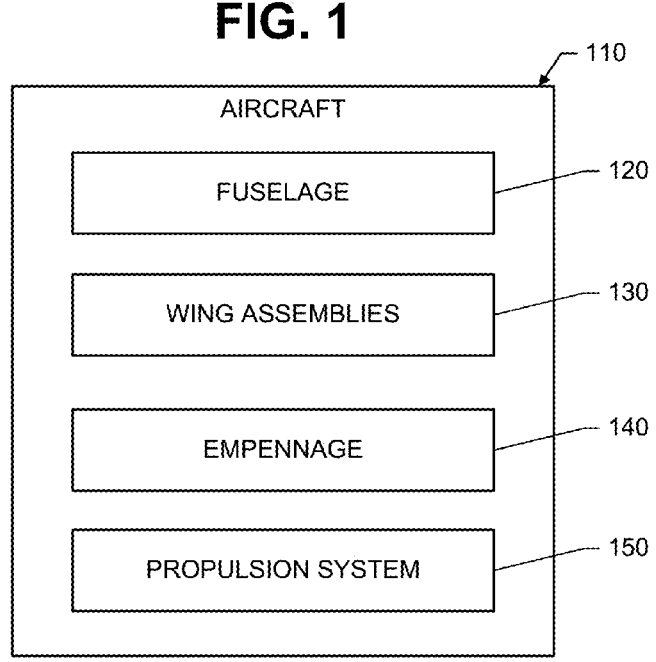
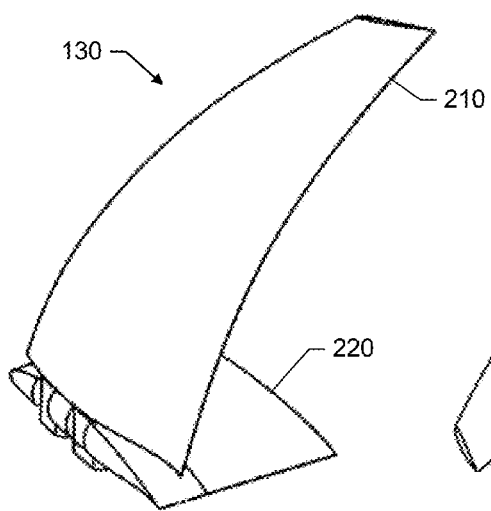
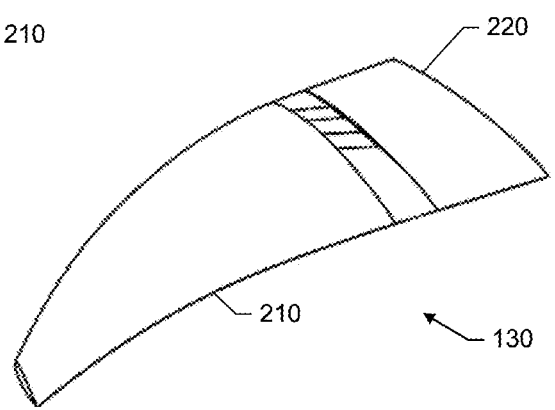
FIG. 1
FIG. 2A
FIG. 2B

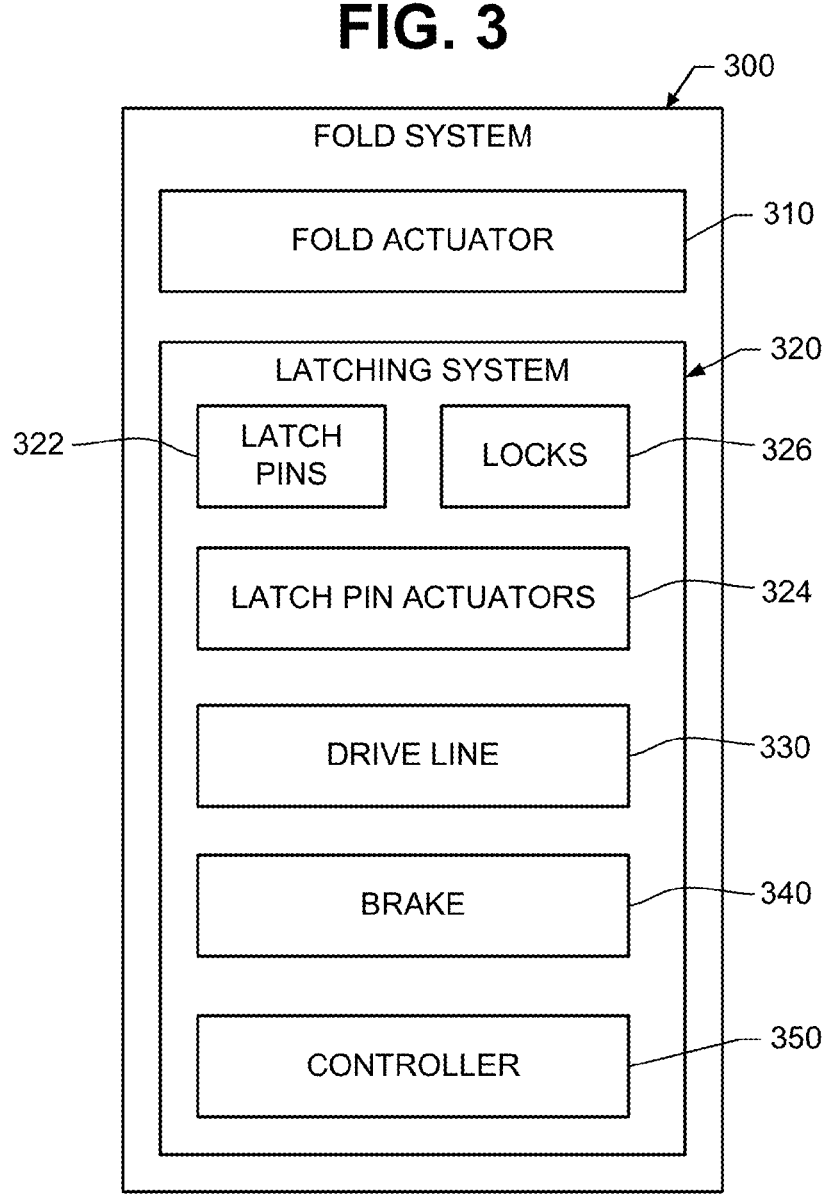

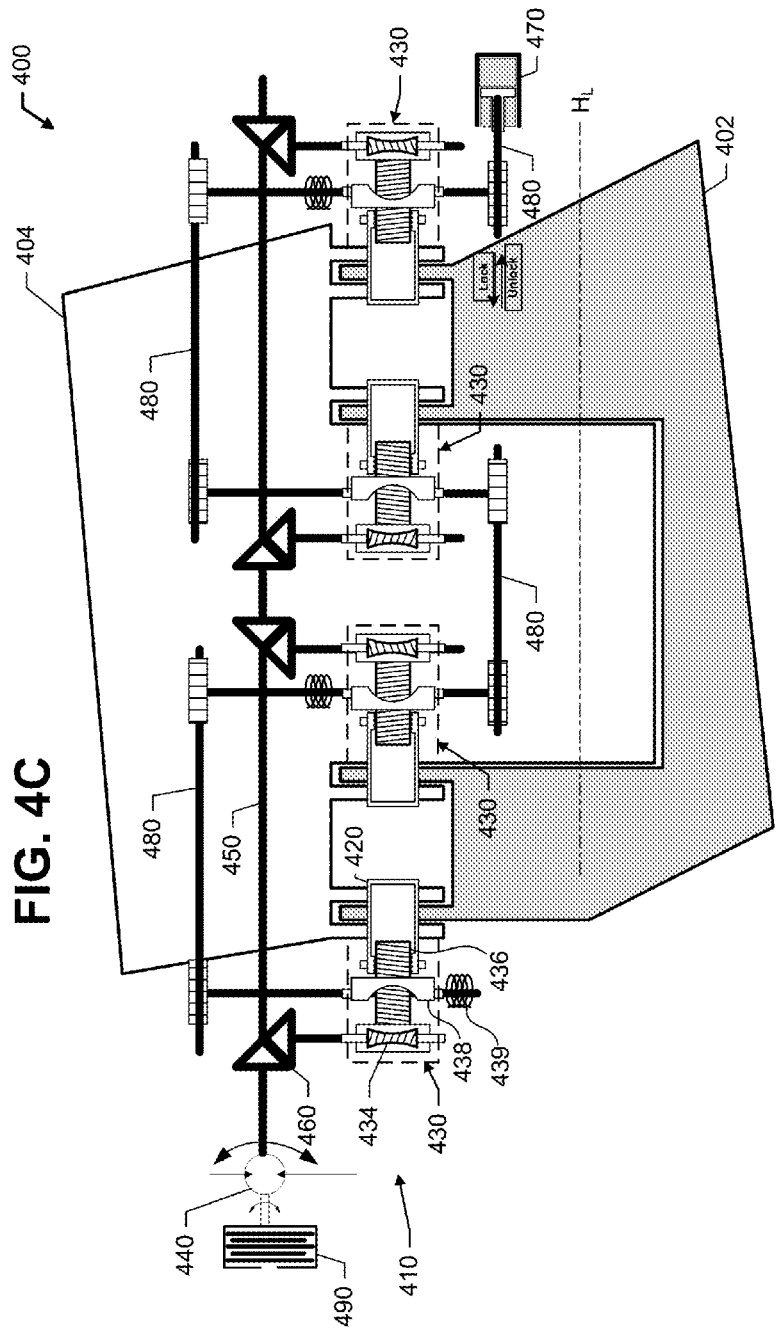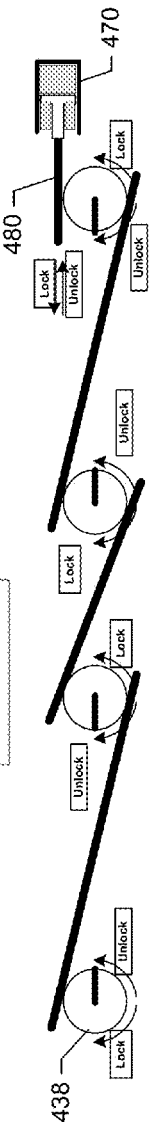

SYSTEM FOR LATCHING AND LOCKING A FOLDING WING

BACKGROUND

Folding wings are commonly used in naval aircraft. Folding wings enable naval aircraft to occupy less space in confined aircraft carrier hangars.

Folding wings are desirable for commercial aircraft. Folding wings may be stowed to fit within airport parking areas and taxiways, and they may be deployed prior to takeoff to increase wing span. Longer span wings are more aerodynamically efficient than shorter wings.

SUMMARY

According to an embodiment herein, a folding wing comprises a fixed section, a folding section, and a latch system for latching the folding section to the fixed section. The latch system includes a plurality of latch pins, and a corresponding plurality of non-backdriveable mechanical actuators for extending the latch pins to engage the folding section.

According to another embodiment herein, a method comprises locking a folding section of a wing to a fixed section, including using a non-backdriveable roller screw to extend a latch pin into the folding section.

According to another embodiment herein, a latch system for a wing having a fixed section and a folding section comprises a latch pin; and a non-backdriveable mechanical actuator for moving the latch pin between a retracted position and an extended position and maintaining the latch pin in the extended position.

These features and functions may be achieved independently in various embodiments or may be combined in other embodiments. Further details of the embodiments can be seen with reference to the following description and drawings.

BRIEF DESCRIPTION OF THE DRAWINGS

FIG. 1 is an illustration of an aircraft including folding wing assemblies.

FIGS. 2A and 2B are illustrations of a folding wing tip in a stowed position and a deployed position, respectively.

FIG. 3 is an illustration of a system for stowing and deploying a folding wing.

FIGS. 4A-4D are illustrations of a latching system including a first arrangement of latch pins.

DETAILED DESCRIPTION

Figures 4A, 4B:
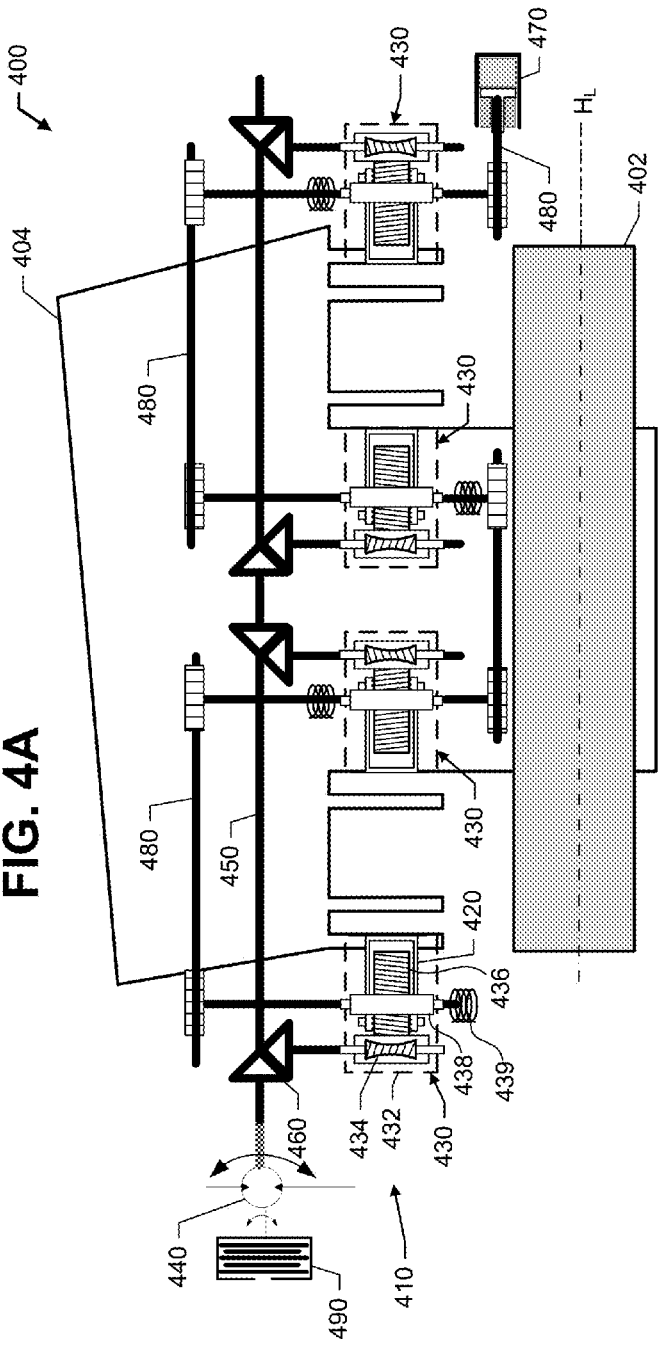

Reference is made to FIG. 1, which illustrates an aircraft 110 including a fuselage 120, folding wing assemblies 130, and empennage 140. One or more propulsion units 150 are coupled to the fuselage 120, wing assemblies 130 or other portions of the aircraft 110. Each wing assembly 130 includes a fixed inboard section and a folding outboard section. The folding section is hinged to the fixed section for movement between a stowed position and a deployed position.

The fixed inboard section may be a main wing or an inboard section thereof. The folding outboard section may be a wing tip or an outboard section of the main wing.

The fixed inboard section typically includes moveable flight control surfaces (e.g., ailerons, slats, flaps). The folding outboard section may or may not include moveable flight control surfaces.

FIGS. 2A and 2B illustrate a wing assembly 130 including a folding wing tip 210 hinged to a fixed main wing 220. FIG. 2A shows the wing tip 210 in a stowed position, and FIG. 2B shows the wing tip 210 in a deployed position.

Reference is now made to FIG. 3, which illustrates a fold system 300 for stowing and deploying a folding wing having a folding section that is hinged to a fixed section. The fold system 300 includes a fold actuator 310 for rotating the folding section about a hinge line between the stowed position and the deployed position. The fold actuator 310 may include a rotary actuator. Examples of the rotary actuator include, but are not limited to, a conventional planetary gearbox, a rotary vane hydraulic actuator, and a hydraulic actuator that has a linear piston pushing against a helical screw.

The fold system 300 further includes a latching system 320 including a plurality of latch pins 322 and a corresponding plurality of mechanical latch pin actuators 324. Each latch pin actuator 324 extends and retracts its latch pin 322. The latch pins 322 are extended into engagement with the folding section when the folding section is fully deployed. The latch pins 322 can take flight loads. The latch pins 322 are retracted to disengage the folding section, thereby allowing the folding section to be rotated back to the stowed position.

Each mechanical latch pin actuator 324 is non-backdriveable so as to lock its corresponding latch pin 322. This feature prevents the latch pin 322 from disengaging the folding section.

The latching system 320 may further include redundant locks 326 for the latch pins 322. Each lock 326 is movable to create physical interference with its corresponding latch pin 322 to ensure that the latch pin 322 remains engaged with the folding section. For example, the locks 326 include cams that flip down behind the latch pins 322. The locks 326 provide dissimilar redundancy to the non-backdriveable latch pin actuators 324.

A drive line 330 may be used to transmit mechanical power to the latch pin actuators 324. A brake 340 may be provided for the drive line 330. By braking the drive line 330 while the folding section is latched and locked in the deployed position, the latching system 320 provides additional dissimilar redundancy to the non-backdriveable latch pin actuators 324.

The latching system 320 further includes a controller 350 for commanding the operation of the fold actuator 310 and the latching system 320. The controller 350 may be microprocessor-based. The controller 350 may communicate with a flight computer (not shown) to determine when to deploy or stow the folding section, and when to lock and latch the folding section.

The latching system 320 may further comprise sensors for sensing displacement of the latch pins 322. The controller 350 may use this sensor information to synchronize the displacement of the latch pins 322 and confirm that the locks 326 have been engaged.

FIGS. 4A-4D illustrate a latching system 410 for a folding wing 400 including a folding section 402 hinged to a fixed section 404 at a hinge line $H_L$. The latching system 410, which is mounted to the fixed section 404, includes latch pins 420 that are inline and are oriented parallel to the hinge line $H_L$. A mechanical latch pin actuator 430 is provided for each latch pin 420. A motor 440 generates rotary power, and a torque shaft 450 and gearboxes 460 transmit the rotary power to the latch pin actuators 430. The rotary power is provided to the latch pin actuators 430 simultaneously.

Each latch pin actuator 430 may include a housing 432, and a gear 434 and roller screw 436 for moving the latch pin 420 in and out of the housing 432. The roller screw 436 is configured to be non-backdriveable. Pitch of the roller screw 436 may be selected so that the roller screw 436 can be turned in one direction by the motor 440, but not turned in an opposite direction by forces acting along an axis of the latch pin 420 (e.g., pushing on the latch pin 420).

Each latch pin actuator 430 is also provided with a lock 438 that is biased towards a locking position by a spring 439. Thus, when the latch pin 420 is extended, the spring 439 forces the locks 438 into a position that prevents the latch pin 420 from being retracted.

Linkages 480 may connect the locks 438 serially with an unlock actuator 470. When actuated, the unlock actuator 470 may rotate the locks 438 simultaneously into an unlock position, which allows the latch pins 420 to be retracted.

FIG. 4A illustrates the folding wing 400 with the folding section 402 stowed and the latching system 410 in an unlatched state. The latch pins 420 are fully retracted. FIG. 4B illustrates the positions of the locks 438 in an unlocked state.

The folding section 402 may be deployed by moving it about the hinge line $H_L$. Once the folding section 402 is deployed, the motor 440 turns the torque shaft 450, which (via the gearboxes 460) turns the gears 434 and roller screws 436. As a result, the latch pins 420 are extended through shear plates and/or torque boxes in both the fixed and folding sections (404 and 402, respectively), thereby latching the folding section 402 to the fixed section 404.

FIG. 4C shows the folding wing 400 with the folding section 402 in the deployed position and the latching system 410 in a latched and locked state. The latch pins 420 extend through shear plates and/or torque boxes in the folding and fixed sections (402 and 404, respectively).

The latch pins 420 are locked automatically. The springs 439 force the locks 438 into a position that prevents the latch pins 420 from being retracted.

A brake 490 may also be applied to the torque shaft 450. Thus, the latch pins 420 are locked with two levels of redundancy: non-backdrivability of the mechanical latch pin actuators 430, braking of the torque shaft 450, and mechanical interference by the locks 438.

When it becomes time to stow the folding section 402, the unlock actuator 470 is actuated to rotate the locks 438 to an unlocked position, the brake 490 is released, and the gears 434 and roller screws 436 are turned to retract the latch pins 420 into their housings 432. The folding section 402 is then moved about the hinge line $H_L$ to the stowed position.

Figure 5:
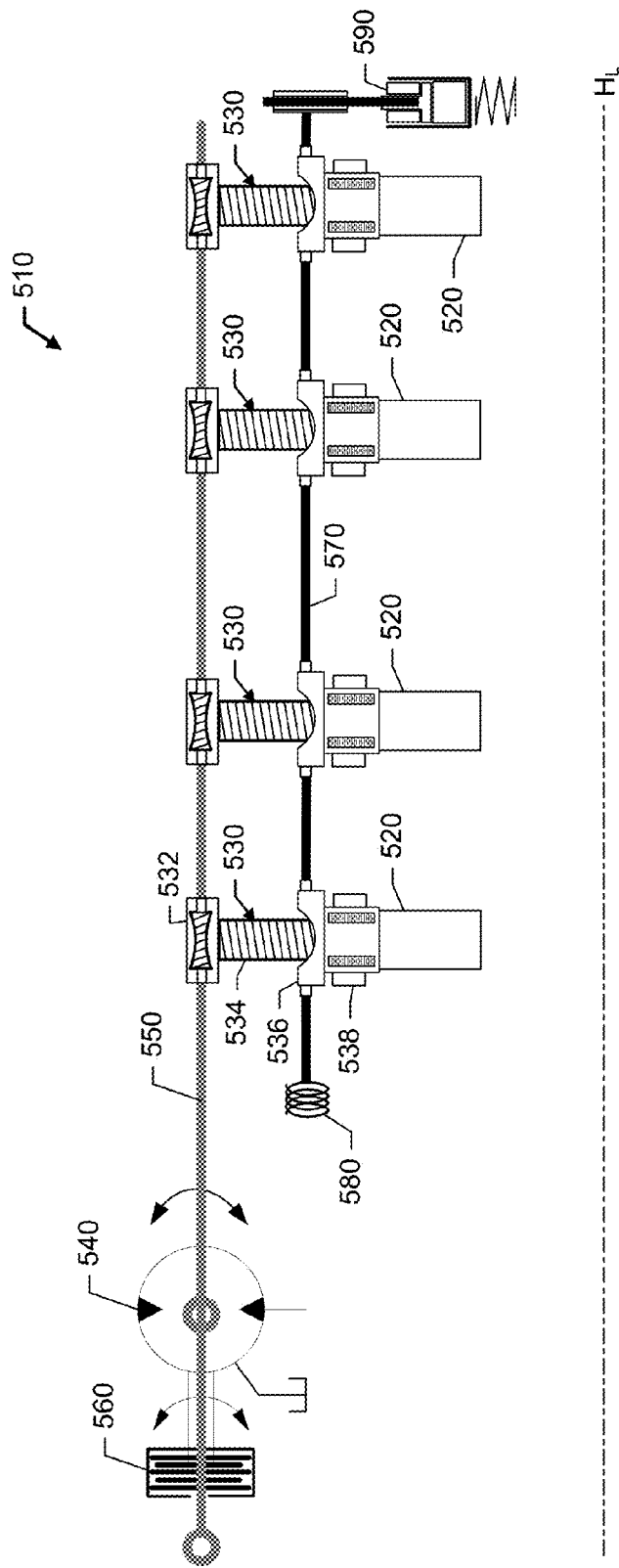
FIG. 5 is an illustration of a latching system including a second arrangement of latch pins.

Reference is now made to FIG. 5, which illustrates a latching system 510 for a folding wing (not illustrated). The folding wing includes a folding portion hinged to a fixed portion about a hinge line $H_L$. The latching system 510 may be mounted to the fixed section of the folding wing.

The latching system 510 includes latch pins 520 oriented perpendicular to the hinge line $H_L$. The latch pins 520 are fully retracted to enable the folding section to be moved between deployed and folded positions. The latch pins 520 are fully extended to engage the folding portion and latch it to the fixed portion.

The latching system 510 further includes a mechanical latch pin actuator 530 for each latch pin 520. Each latch pin actuator 530 includes a gear 532 and roller screw 534 for extending and retracting the latch pin 520.

A drive line includes a motor 540 for generating rotary power, and a torque shaft 550 for transmitting the rotary power to the gears 532 of the latch pin actuators 530. The gears 532 may be in-line and mounted to the torque shaft 550, resulting in a straight path for the drive line. A brake 560 may be coupled to the torque shaft 550.

Each mechanical latch pin actuator 530 may further include a lock 536. Linkages 570 may connect the locks 536 of the different latch pin actuators 530 in serial. A spring 580 biases the locks 536 towards a locked position. When the latch pins 520 are extended, the spring 580 applies the locks 536 to the latch pins 520. An unlock actuator 590 may be used to rotate the locks 536 into an unlock position, which allows the latch pins 520 to be retracted.

In some configurations of a latching system herein, one of the latch pins may be extended into the folding section before extending the other pins. For instance, one latch pin may be longer and closer to engagement than the other latch pins. When all of the latch pins are extended at the same time, the longer latch pin engages the folding section first. In another configuration, one latch pin may be controlled independently of the other latch pins and may be extended before the other latch pins are extended.

Figure 6A:
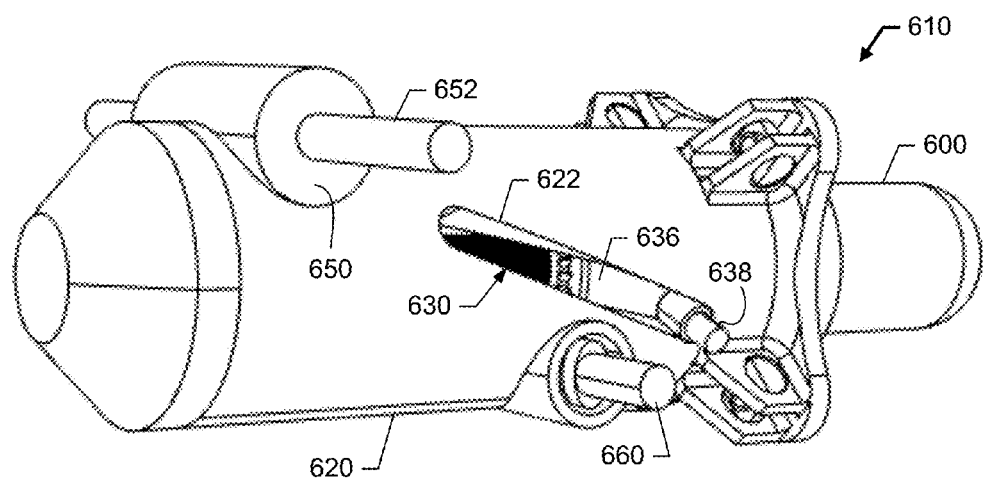
FIGS. 6A-6C are illustrations of a non-backdriveable mechanical actuator for extending and retracting a latch pin.
Figure 6B:
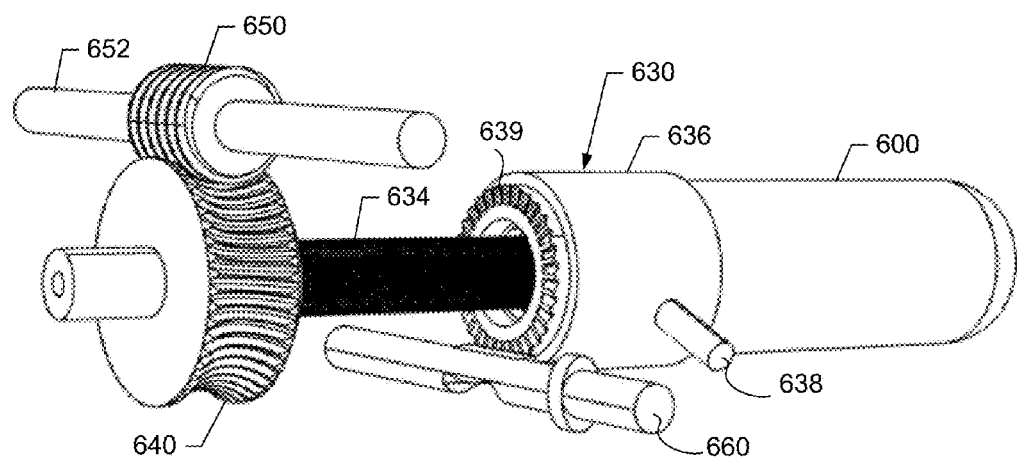
Figure 6C:
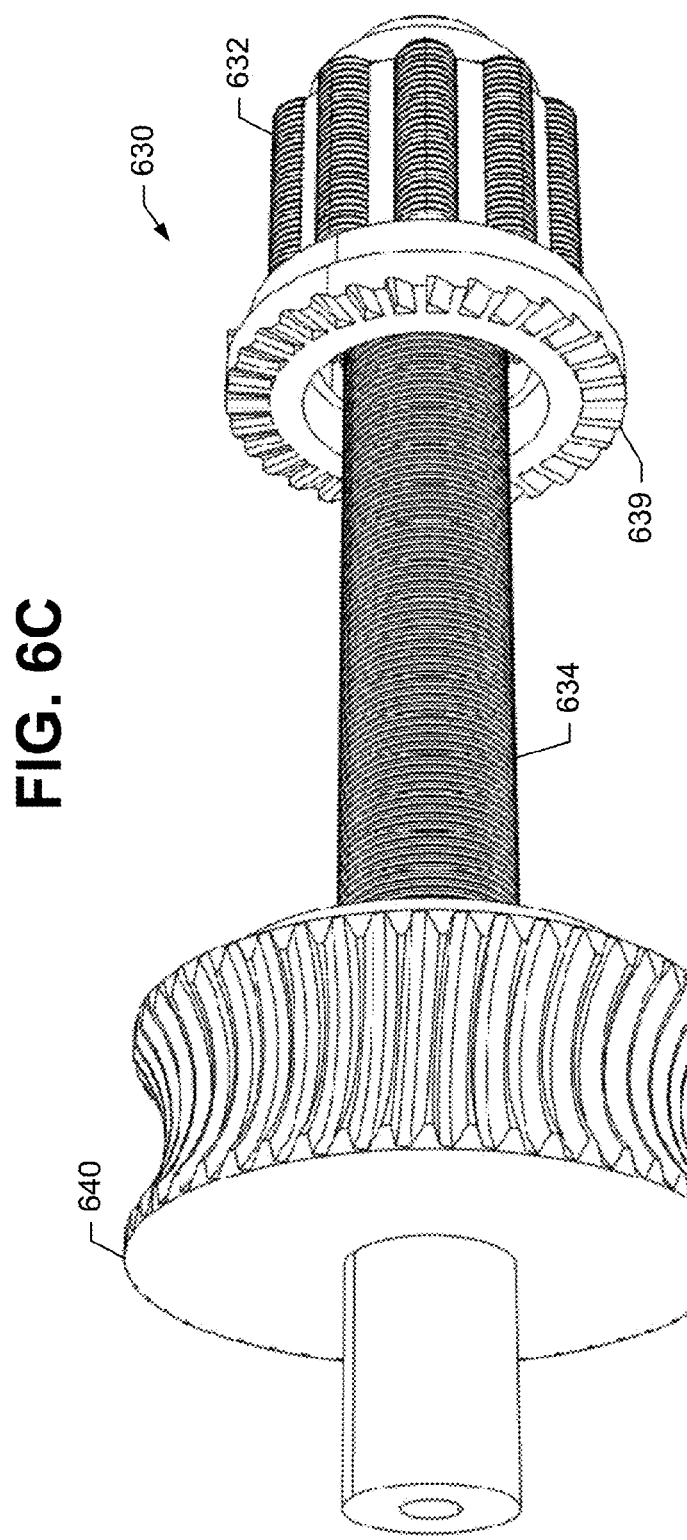

Reference is now made to FIGS. 6A-6C, which illustrates an example of a non-backdriveable mechanical actuator 610 for a latch pin 600. FIG. 6A illustrates a housing 620 for the mechanical actuator 610. FIG. 6B illustrates the mechanical actuator 610 with the housing 620 removed, thereby revealing the following components: a roller screw 630, worm drive 640, 650 and lock 660. FIG. 6C illustrates the roller screw 630 in greater detail.

The roller screw 630 is located within a cavity of the housing 620. The roller screw 630 may include multiple threaded helical rollers 632 assembled in a planetary arrangement around a threaded shaft 634. A threaded nut 636 contains the rollers 632. The threaded shaft 634 is journaled for rotation within the housing 620.

An arm 638 extends outward from the nut 636. The arm 638 rides in a slot 622 in the housing 620. The combination of the arm 638 and the slot 622 prevent the nut 636 from spinning relative to the housing 620. As a result, rotation of the threaded shaft 634 is converted into linear movement of the nut 636.

The nut 636 is connected to the latch pin 600. Rotating the threaded shaft 634 in one direction causes the latch pin 600 to move towards a retracted position. Rotating the threaded shaft 634 in the opposite direction causes the latch pin 600 to move towards an extended position. When the latch pin 600 is fully retracted, it is entirely inside the housing 620. When the latch pin 600 is extended, it protrudes from an end of the housing 620. The combination of the nut 636, the arm 638 and the slot 622 defines fully extended and fully retracted positions of the latch pin 600.

The threaded shaft 634 is rotated by the worm drive, which includes a worm gear or wheel 640 at an end of the threaded shaft 634, and a worm 650 that engages the worm wheel 640. The worm 650 may be turned by an input shaft 652.

The roller screw 630 has a pitch that allows the worm drive to turn the threaded shaft 634, but that does not allow the threaded shaft 634 to be turned by forces acting along an axis of the latch pin 600. The pitches on the shaft 634, the rollers 632 and the nut 636 all may have the same number of threads per inch. However, a high number of threads per inch is selected to make the roller screw 630 non-backdriveable.

Figure 8B:
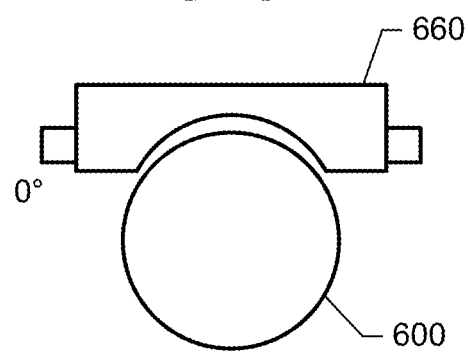
FIGS. 8A and 8B are illustrations of a lock in a locked position and an unlocked position, respectively.
Figure 8A:
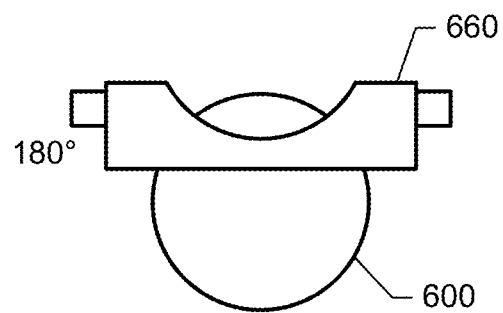

The lock 660 may include a rotating cam that is rotatable between a locked position and an unlocked position. In the locked position, the lock 660 prevents the latch pin 600 from moving via physical interference (FIG. 8A). In the unlocked position, the lock 660 allows the latch pin 600 to be retracted (FIG. 8B). The rotating cam may also include teeth for engaging a roller cage 639 of the roller screw 630.

A standard roller screw 630 is shown in FIG. 6C. However, a mechanical latch pin actuator herein is not so limited. Other configurations may use other types of roller screws, such as inverted, recirculating, and bearing ring roller screws.

Still other configurations of a mechanical latch pin actuator herein may use a different type of screw that is non-backdriveable. For instance, an Acme screw may be used instead of a roller screw.

Some configurations of the mechanical latch pin actuator may use gears other than a worm drive. For instance, spiroid gears may be used to turn the roller screw.

Some configurations of a mechanical latch pin actuator herein may use a lock other than a rotating cam to create physical interference. For example, the lock may include a lock pin extending through the side of the housing 620 perpendicular to the latch pin travel. The lock pin may be actuated by a solenoid.

Figure 7:
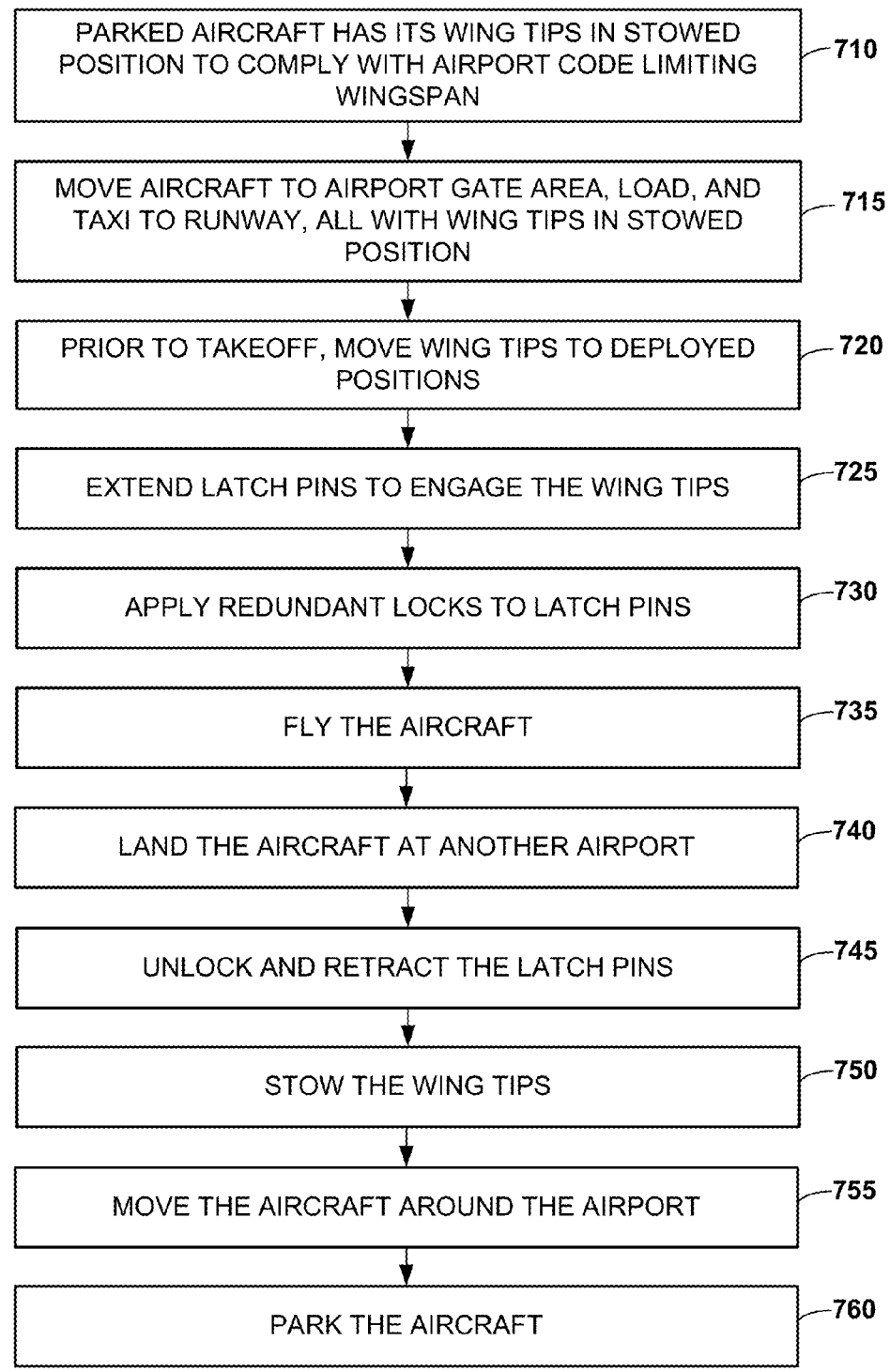
FIG. 7 is an illustration of a method of enhancing performance of a commercial aircraft including wing assemblies with folding wing tips.

Reference is now made to FIG. 7, which illustrates a method of enhancing performance of a commercial aircraft including wings with folding wing tips. At block 710, the aircraft is parked at an airport that places limits on aircraft wingspan length. For instance, the airport is an ICAO Code E airport, which limits wingspan to less than sixty five meters. The aircraft is parked with its wing tips in a stowed position.

At block 715, the aircraft is moved to a gate, loaded, and taxied to a runway. The wing tips remain in the stowed position so the aircraft can fit within taxiways en route to the runway.

At block 720, prior to takeoff, the wing tips are deployed. Fold actuators rotate the wing tips from the stowed position to a deployed position.

At block 725, latch pins are extended to engage the folding wing tips. In this manner, the wing tips are latched to the fixed sections. The non-backdriveable mechanical latch pin actuators ensure that the latch pins are not retracted.

At block 730, redundant locks are applied to the latch pins. The locks are moved into a position that prevents the latch pins from being retracted. Brakes are applied to the torque lines, which further prevents the latch pins from being retracted.

At block 735 the aircraft is flown. With the wing tips extended, wingspan of the aircraft is extended. As a result, aerodynamic efficiency of the aircraft is increased. The greater aerodynamic efficiency results in lower fuel consumption during flight and, therefore, lowers operating costs and increased lift to optimize take-off.

At block 740, the aircraft lands at another airport. If the airport requires the wing tips to be stowed, the locks are unlocked, the brakes are released, and the mechanical actuators retract the latch pins (block 745). With the wing tips now disengaged from the fixed sections, the wings tips are stowed (block 750).

At block 755, the aircraft is moved around the airport. Since the wing tips are stowed, the aircraft complies with airport requirements as it is moved around the airport.

At block 760, the aircraft is parked. Since the wing tips are stowed, the aircraft occupies less space while parked.

A latch/lock system is not limited to folding wing tips. More generally, it can be applied to a wing having a fixed section and a folding section.

A latching system herein is not even limited to commercial aircraft. For instance, a latching system herein may be applied to wings of other aircraft, helicopter blades, wind generator turbine blades, truck tailgates, folding ramps, robotic arms, etc.

The invention claimed is:

1. A folding wing comprising:
a fixed section;
a folding section, the folding section hinged to the fixed section at a hinge line; and
a latch system for latching the folding section to the fixed section, the latch system including a plurality of non-backdriveable mechanical latch pin actuators, each non-backdriveable mechanical latch pin actuator comprising a long axis extending through a first end and a second end, each non-backdriveable mechanical latch pin actuator oriented so that the long axis is parallel with the hinge line, each non-backdriveable mechanical latch pin actuator comprising a latch pin, each latch pin configured to move along the long axis between a retracted position and an extended position, each latch pin in the extended position configured to engage the folding section, each non-backdriveable mechanical latch pin actuator further comprising a lock, each lock comprising a lock axis extending through a first side and a second side, each lock oriented so that the lock axis is orthogonal to the long axis, each lock rotatable about the lock axis between an unlocked position and a locked position, each lock configured to create physical interference with its corresponding latch pin in the locked position.

2. The wing of claim 1, further comprising a drive line for transmitting mechanical power to the plurality of non-backdriveable mechanical latch pin actuators.

3. The wing of claim 2, further comprising a brake for the drive line.

4. The wing of claim 1, wherein the latch system is configured to extend one of the latch pins into the folding section before extending another latch pin into the folding section.

5. The wing of claim 1, wherein each non-backdriveable mechanical latch pin actuator further comprises a housing for its corresponding latch pin, and a roller screw configured to move the latch pin between the retracted position and the extended position, the roller screw further configured to be non-backdriveable.

6. The wing of claim 5, wherein each roller screw includes a threaded shaft, multiple threaded helical rollers assembled in a planetary arrangement around the threaded shaft, and a threaded nut containing the rollers.

7. The wing of claim 6, wherein the roller screw has a pitch that allows one end of the threaded shaft to be turned, but does not allow an opposite end of the threaded shaft to be turned by forces acting along an axis of the latch pin.

8. The wing of claim 5, wherein each lock is a cam lock.

9. The wing of claim 1, wherein the folding section is a wing tip.

10. An aircraft comprising the folding wing of claim 1.

11. A latch system for a wing having a fixed section and a folding section, the folding section hinged to the fixed section at a hinge line, the system comprising:
 a latch pin configured to move between a retracted position and an extended position along a long axis, the long axis parallel with the hinge line;
 a non-backdriveable mechanical latch pin actuator configured to move the latch pin between the retracted position and the extended position and maintaining the latch pin in the extended position; and
 a spring-biased mechanical lock, the spring-biased mechanical lock comprising a lock axis extending through a first side and a second side, the spring-biased mechanical lock oriented so that the lock axis is orthogonal to the long axis, the spring-biased mechanical lock rotatable about the lock axis between an unlocked position and a locked position, the spring-biased mechanical lock configured to create physical interference behind the latch pin after the latch pin has been moved to the extended position.

12. The system of claim 11, further comprising a drive line for transmitting mechanical power to the non-backdriveable mechanical latch pin actuator.

13. The system of claim 12, further comprising a brake for the drive line.

14. The system of claim 11, wherein the non-backdriveable mechanical latch pin actuator further comprises a housing for the latch pin, and a roller screw configured to move the latch pin between the retracted position and the extended position, the roller screw further configured to be non-backdriveable.

* * * * *